United States Patent [19]

Marietta et al.

[11] Patent Number: 4,616,782

[45] Date of Patent: Oct. 14, 1986

[54] SPRAY GUN CARRIAGE ASSEMBLY HAVING INERTIAL DAMPING AND A VARIABLE STROKE

[75] Inventors: Charles F. Marietta, Norwalk; Kenneth Holley, South Amherst, both of Ohio

[73] Assignee: Nordson Corporation, Amherst, Ohio

[21] Appl. No.: 693,676

[22] Filed: Jan. 22, 1985

[51] Int. Cl.[4] .......... B05B 3/18; B05B 3/00; B25J 17/00; F16H 27/02

[52] U.S. Cl. .......... 239/752; 267/137; 267/150; 118/323; 74/89.21; 901/43; 901/48; 414/719

[58] Field of Search .......... 239/184, 186, 191; 118/323; 74/89.2, 89.21, 89.22, 479; 267/8 R, 136, 137, 140.1, 150; 91/4, 361, 363 R, 368; 901/43, 48; 414/719

[56] References Cited

U.S. PATENT DOCUMENTS

| | | | |
|---|---|---|---|
| 1,316,937 | 9/1919 | Brewster | 118/323 |
| 2,553,248 | 5/1951 | Graham | 267/150 |
| 2,955,568 | 10/1960 | Blenman et al. . | |
| 3,027,869 | 4/1962 | Ball . | |
| 3,434,416 | 3/1969 | Testone . | |
| 3,463,121 | 8/1969 | Walberg | 118/631 |
| 3,536,165 | 10/1970 | Desjardins | 188/380 |
| 3,592,387 | 7/1971 | Pilott et al. | 118/323 X |
| 3,606,162 | 9/1971 | Lehmann . | |
| 3,674,207 | 7/1972 | Carbonetti, Jr. et al. . | |
| 3,802,318 | 4/1974 | Sibbald | 91/4 R |
| 4,002,143 | 1/1977 | Dover . | |
| 4,011,833 | 3/1977 | Hawkins | 118/323 |
| 4,173,198 | 11/1979 | Allen . | |
| 4,182,980 | 1/1980 | Tholome | 318/467 |

FOREIGN PATENT DOCUMENTS 1033113 9/1953 Fed. Rep. of Germany .

*Primary Examiner*—Joseph F. Peters, Jr.
*Assistant Examiner*—Patrick N. Burkhart
*Attorney, Agent, or Firm*—Wood, Herron & Evans

[57] ABSTRACT

A spray gun carriage assembly is disclosed which provides rapid and accurate reciprocating vertical movement of a spray gun mounted on the assembly, with the stroke of the gun movement being readily adjustable. The spray gun carriage is also movable in two additional axes, i.e., in a horizontal plane. A horizontally extending boom is reciprocated vertically to move the spray gun up and down relative to a workpiece, such as a workpiece being conveyed past the carriage assembly. A first shock absorber mechanism dampens the moment of inertia of the boom, and a second shock absorber mechanism dampens the linear inertia associated with vertical movements of the boom, thus providing for quick and accurate spray gun movements and faster and more efficient spraying. A mechanism is further provided for pivoting spray guns mounted adjacent the end of the boom to yield still further adjustment of spray direction. A quick change flight bar facilitates rapid changeover of the spray guns used with the assembly. The flight bar has a mounting plate which is received on the pivoting mechanism, and has a shaft extending from the plate on which a plurality of spray guns are supported. Changeover from one set of spray guns to another is rapidly accomplished through the simple exchange of flight bars on the pivoting mechanism.

24 Claims, 15 Drawing Figures

SPRAY GUN CARRIAGE ASSEMBLY HAVING INERTIAL DAMPING AND A VARIABLE STROKE

FIELD OF THE INVENTION

This invention relates generally to carriages for moving one or more mounted spray guns relative to a workpiece, and more particularly relates to a spray gun carriage assembly which has three axes of movement for rapidly shifting a spray gun or guns relative to a conveyed workpiece during a spray program.

BACKGROUND OF THE INVENTION

A known technique for applying a coating to a plurality of workpieces is to convey the workpieces in a line past a station having one or more spray guns which apply the coating to the workpiece as it passes by. For example, it is common to convey appliances, furniture, automobile body parts and the like to be spray coated, e.g., spray painted, through such a spray station. The spray guns may be stationarily mounted to simply spray the workpiece as it passes by, or mounted on a moveable arm, for example, which is programmed for movement about the workpiece as it passes by. Providing such movement for the spray gun permits the use of fewer spray guns, since the spray guns are mobile and can be variably targeted during a spray program, and allows for more accurate aiming of the spray guns.

A spray gun assembly having a movably mounted spray gun or guns must be capable of effecting fairly quick movements of the spray gun or guns to keep pace with a rapid progression of workpieces being conveyed by. Rapid movement of the spray gun or guns vertically relative to the workpiece is particularly necessary to completely coat the workpiece from top to bottom. That is, the spray gun or guns will have to make a number of vertical passes to coat the side of a wide workpiece which is being conveyed by.

A known way to accomplish rapid vertical, or "Z" axis, movement of a spray gun is to mount the gun on a driven chain which carries the gun around a vertically extending loop, such that the gun makes a vertically upward and a vertically downward pass by the workpiece in each circuit around the loop. The spray gun is typically programmed to spray only during selected intervals when it is passing by the workpiece.

One principal problem with this loop conveyor is that it is not readily adjustable to vary the vertical travel of the spray gun with the vertical dimensions of the workpiece. That is, the stroke of the spray gun is not easily changed, since this requires a change in the size of the chain loop. For example, it is desirable to have a shorter vertical stroke for workpieces with a short vertical height and a longer stroke for workpieces with a long vertical height. The stroke also cannot be adjusted to vary with any change in vertical dimension across the individual workpiece. A car body, for instance, has substantial variations in vertical height along its contour.

SUMMARY OF THE INVENTION

One solution to the problem of how to rapidly move a spray gun relative to a workpiece with a variable stroke is to rapidly reciprocate the spray gun along a vertical path, with the distance of travel of the spray gun along the path thereby being readily controlled and varied by a suitable drive mechanism. Vertical movements, such as at speeds of up to 200 feet per minute, can generate substantial linear inertia in the spray gun and the portion of the spray gun mounting assembly which is vertically moved, however. That is, if the spray gun is accelerated and decelerated along the vertical, or Z axis, this results in a force that is imposed on the equipment when it starts or stops. This force, developed from a change in linear inertia, can produce considerable stress and strain on the equipment, and result in mistargeting, such as from overshooting a desired stop point. A substantial moment of inertia can also be generated if the spray gun is mounted on an arm or boom which is being rapidly conveyed along the Z axis. The arm or boom functions as a lever arm, and when accelerated or decelerated along the Z axis (and perpendicular to its length), produces a torque on its mount. This torque places an undesirable strain on the arm, its mount and associated equipment. It can further result in a wobble or oscillation of the arm or boom which interferes with rapid and accurate positioning of the spray gun.

The present invention is in a spray gun carriage assembly which is predicated upon the concept of providing for rapid and accurate reciprocating movement of a spray gun or guns mounted on the assembly, with the stroke of the gun or guns being readily adjustable, such as during a spray program. A significant feature of the invention resides in a shock absorbing mechanism for damping of the moment of inertia and linear inertia generated from the reciprocating movement. More particularly, the present invention includes a boom which carries a spray gun at one end. The boom is reciprocated along a geometric axis, e.g., vertically, in a path generally perpendicular to the boom's length, and shock absorbing mechanisms are provided to dampen the moment of inertia of the boom as well as the linear inertia attendant to movement of the boom, for quick and accurate spray gun movements and faster and more efficient spraying.

In a present embodiment of the invention, the spray gun carriage assembly generally comprises a base which is mounted for movement along two orthogonal axes, or as referred to herein, in both an X and a Y direction. This provides movement of the entire assembly toward and away from a workpiece being conveyed past the assembly (Y direction) as well as movement parallel to the conveyor path (X direction). The conveyor assembly further includes an elongated boom which extends in a generally horizontal plane, and carries a spray gun mount adapted to receive at least one spray gun thereon, and preferably a plurality of spray guns.

An elevator, or reciprocating, mechanism moves the boom vertically relative to the workpiece to be sprayed (i.e., in the Z axis direction). This reciprocating mechanism is carried by the base. In a preferred form of the invention, the boom is carried by a carrier plate which forms part of the reciprocating mechanism. This carrier plate is mounted to travel along a pair of vertically extending rails, with the plate mounted to a chain which moves the carrier plate and boom rapidly along a substantially vertical path.

Rapid movement of the boom along the Z axis causes a substantial moment of inertia to be developed in the elongated boom. This places a substantial torque on the boom at the point of its connection to the carrier plate, which in turn places a significant amount of stress on the boom, the carrier plate as well as the chain during vertical acceleration and deceleration. One of the principal objectives of the present invention is to provide means for substantially eliminating any deleterious effects of these inertial forces. In accordance with this invention, the boom is not rigidly attached to the carrier plate but rather is pivotally mounted thereon. The boom is thus permitted limited pivotal movement which is rapidly damped to prevent any appreciable oscillation of the boom.

More specifically, the boom is journaled on a shaft extending from the carriage plate to allow limited pivotal movement of the boom in the vertical plane, i.e., in a plane parallel to the Z axis. The boom has a boom centering portion which extends generally perpendicular to the boom, and in the same vertical plane. Mounted on opposite lateral sides of this boom centering portion are opposed compression springs. The boom is thus captured between and centered by the action of these springs on the boom centering portion, such that the elongated portion of the boom remains substantially horizontal. Limited pivotal movement of the boom about its mounting shaft resulting from acceleration or deceleration of the boom is provided, however.

Pivotal mounting of the boom translates the moment of inertia developed in acceleration and deceleration of the boom into a rotational inertia, i.e., an angular or rotary force. This rotational inertia is dampened through the use of a shock absorber, such as a pneumatic shock absorber, which operates against movement of the boom centering portion. This construction is effective to dampen and effectively dissipate the rotational inertia of the boom to minimize oscillation of the boom arm, and minimize stress on the boom, carriage plate and chain. Very rapid movement of the spray gun or guns mounted on the boom can thus be effected while maintaining the accuracy of the spray gun aim.

The present invention also contemplates the use of a second shock absorber mechanism for further damping the linear inertia of the boom, as well as the carriage plate and related parts, caused by movement along the Z axis.

In a preferred form, the second shock absorber mechanism for damping this linear inertia comprises a carriage plate mount which is fixed to the chain, and has sides extending laterally from the chain. One pair of compression springs is located on the top of the carriage plate mount on opposite sides of the chain, with another pair of springs likewise located on the bottom of the carriage plate mount, again on opposite sides of the chain. The top and bottom pairs of springs are mounted to the carriage plate, such that the carriage plate is thereby suspended on the chain by the springs.

The second shock absorber mechanism further includes two pair of oppositely positioned shock absorbers, such as pneumatic cylinders. One shock absorber of each pair is connected between the carriage plate and the top of the carriage plate mount, while the other shock absorber of the pair is similarly connected between the carriage plate and the bottom of the carriage plate mount. In the preferred form of the invention, one pair of shock absorbers is so located on one side of the chain, with a like pair of shock absorbers similarly located on the other side of the chain.

The carriage plate has a limited amount of vertical movement on the chain permitted by its "float" on the springs. Any such vertical movement is opposed, however, by the shock absorbers. The opposed pairs of shock absorbers thus effectively damp the linear inertia generated through the rapid movement of the boom, boom carriage plate, and other parts along the Z axis, reducing the stress on the chain, the chain drive mechanism, and the various connections between the carriage plate, chain and boom.

It is a further object of the present invention to provide a spray gun carriage assembly including means for pivoting spray guns mounted adjacent the end of the boom to provide still further adjustment of spray direction. For example, it may be desired to aim the nozzles of the spray guns upwardly or downwardly, depending on the direction of vertical movement relative to the workpiece. To this end, the spray guns are mounted upon a member which is preferably in the form of a shaft extending horizontally from the boom and rotatably mounted adjacent the boom end. This shaft is connected through a linkage to a drive mechanism, such as a pneumatic cylinder carried by the boom. Actuation of the drive mechanism effects pivotal movement of the spray gun mounting shaft to tip the spray guns downwardly or upwardly.

It is another object of the present invention to provide a mechanism facilitating rapid changeover of the spray guns used with this assembly. This objective is accomplished by a flight bar which is adapted to carry a plurality of spray guns thereon. The flight bar has a mounting plate which is received on the spray gun mount shaft and/or boom end, and has a flight shaft fixed to the mounting plate on which the spray guns are situated. Changeover from one set of spray guns to another, such as where a different nozzle size may be desired, is rapidly accomplished through the simple interchange of flight bars on the mount shaft and/or boom end.

Other objects and advantages of this invention will be more readily understood upon consideration of the following detailed description of an embodiment of the invention, taken in conjunction with the drawings, in which:

DETAILED DESCRIPTION OF THE INVENTION

General Description

Figure 1:
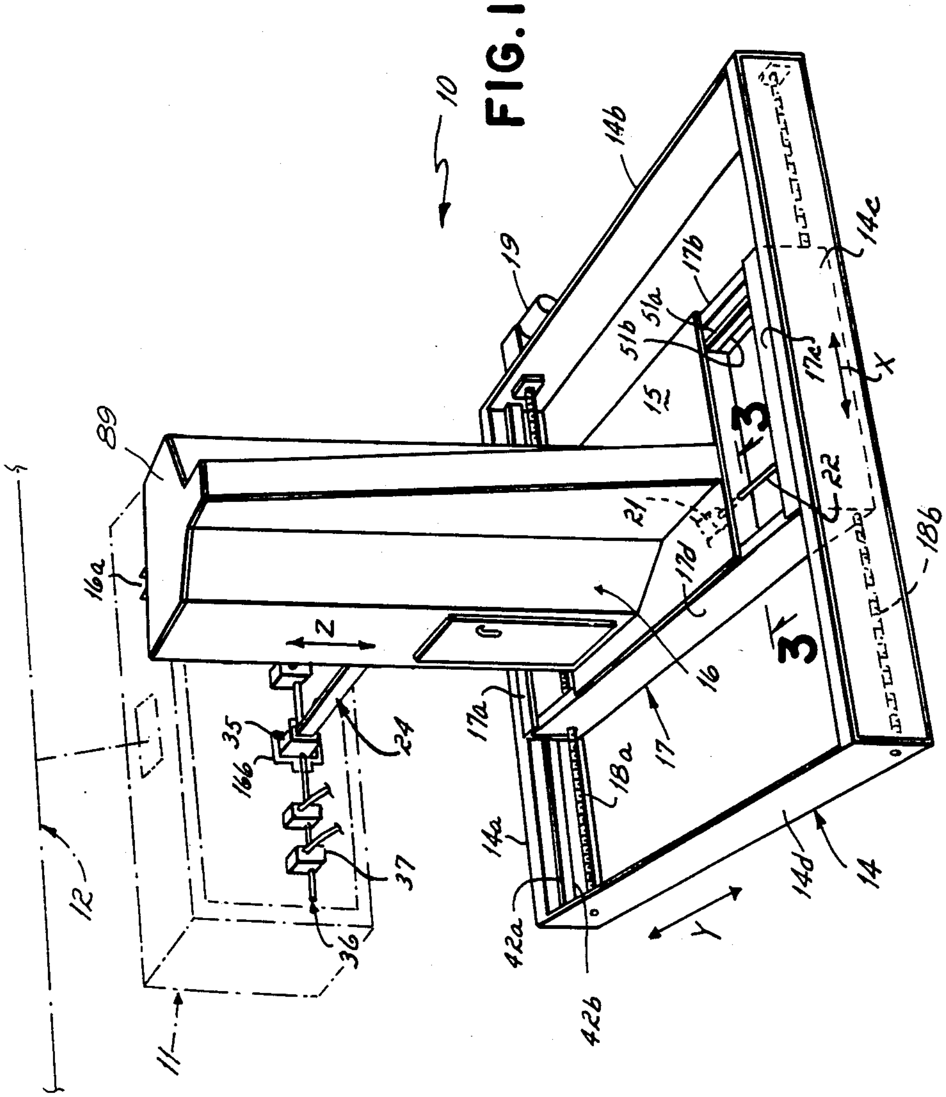
FIG. 1 is a perspective view of a spray gun carriage assembly made in accordance with the teachings of this invention.

FIGS. 1, 1A, 1B and 1C show the overall construction of a preferred embodiment of a spray gun carriage assembly 10 made in accordance with the present invention. The carriage assembly is utilized for spraying a coating, such as paint or the like, on a plurality of workpieces, such as a plurality of refrigerator bodies 11, being conveyed past the assembly 10 by conveyor 12.

The assembly 10 has a stationary rectangular frame 14 which is mounted adjacent the horizontal conveyor 12. A base 15 is mounted on an inner frame 17 which is movable in the X axis direction, that is, parallel to the conveyor path, by a suitable mechanism, such as a worm gear drive mechanism including a pair of tandem worm gears or screws 18*a, b* and a drive motor 19 for rotating the worm gears. Base 15 is mounted on inner frame 17 for movement relative to the frame in the Y axis direction, that is, toward and away from the conveyor 12. A suitable mechanism for driving the base 15 in the Y direction is provided including a hydraulic cylinder operated by an air-over-oil control system (to be described in further detail hereinafter) having its cylinder portion 21 fixed to the underside of the base 15 by a suitable mounting bracket (not shown) and its pushrod 22 connected at one end to part of the movable frame 17.

A generally horizontal boom 24 extends from a housing 16 carried by the base 15. The boom 24 is supported for movement in the Z axis direction, i.e. vertically, by a Z axis elevator or reciprocating mechanism carried by the base 15 and located within a housing 16. Housing 16 may be formed of sheet metal, for example, and has a vertical slot 16*a* through which the boom 24 extends.

The Z axis reciprocating mechanism (shown schematically in FIGS. 1B and 1C) generally comprises a boom carrier plate 27 to which the boom 24 is pivotally mounted on a shaft 28. The carrier plate 27 is driven along the Z axis through connection to a chain 30 forming part of a chain drive mechanism, which includes a driven sprocket 31 and idler sprocket 32 around which the chain 30 travels. Carrier plate 27 travels along a pair of parallel vertical rails 29*a*, 29*b* which extend within the housing 16.

Boom 24 carries a spray gun mount 35 at its free end. A flight bar 36 having a plurality of spray guns 37 is mounted on the spray gun mount 35. As will be described in more detail herein, the spray gun mount 35 has a rotatable shaft 38 permitting the flight bar 36 to be pivoted (as shown in phantom in FIG. 1B) to aim the spray guns 37 upwardly or downwardly, as desired.

The plurality of spray guns 37 can thus be moved parallel to the conveyor path by driving the movable frame 17 in the X direction, and can be moved toward or away from the conveyor path through movement of the base 15 in the Y direction on movable frame 17. Movement of the spray guns 37 vertically relative to the conveyor path is accomplished through movement of the boom 24 in the Z axis direction. A present embodiment provides for maximum X axis travel on the order of 36 inches, Y axis travel on the order of 30 inches, with the Z axis travel or stroke on the order of 84 inches (distances between end positions are approximated by phantom lines in FIGS. 1A and 1B). Movement in each such axis can be made simultaneously, since the various drive mechanisms operate independently of each other. It will be understood that a suitable system would be provided to actuate each of the drive mechanisms according to a pre-arranged spray program.

X and Y Axis Movement

Figure 2:
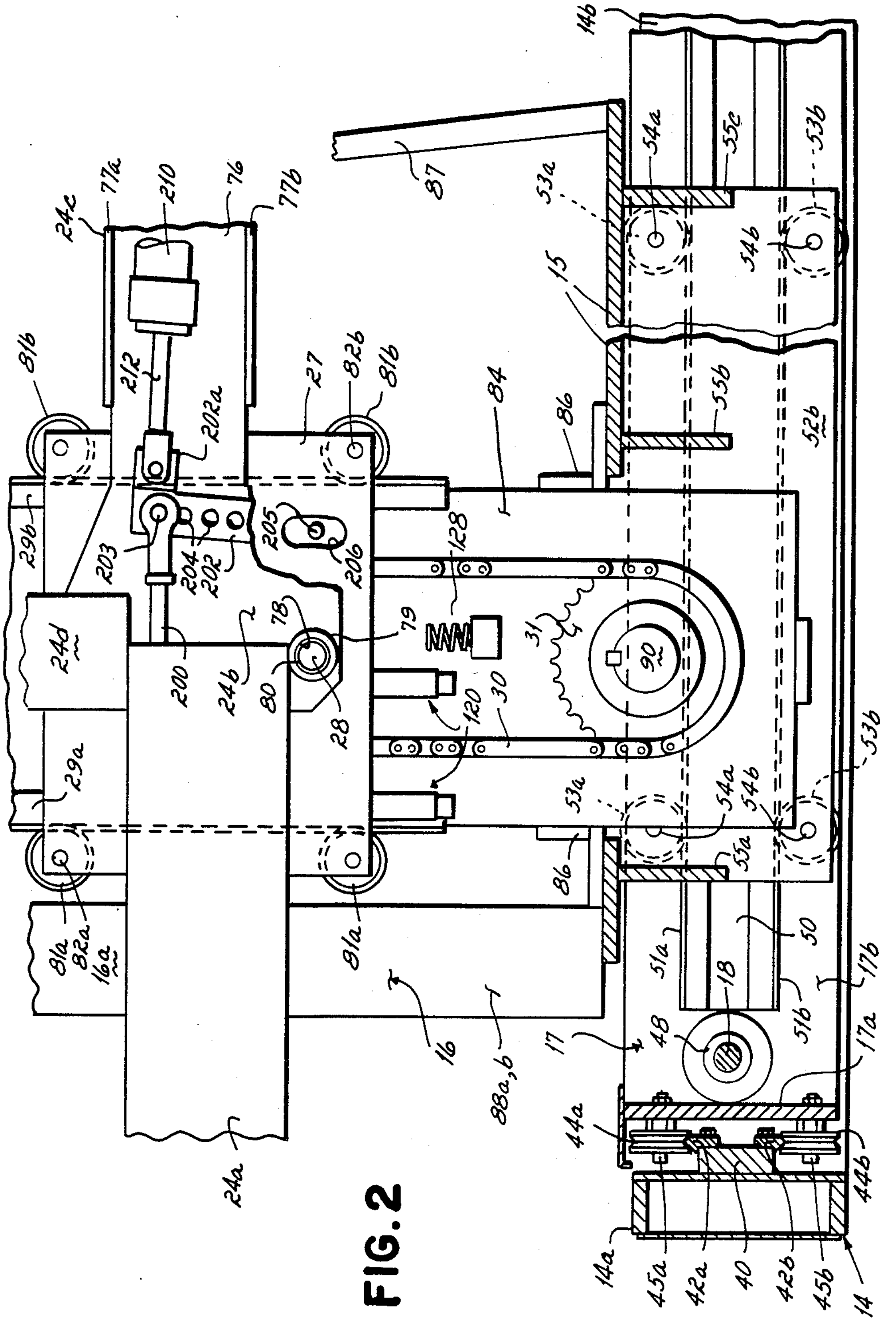
FIG. 2 is a fragmentary side elevational view of the lower portion of the carriage assembly as seen from the interior of the inner frame of the housing, the housing being removed for clarity.

With reference to FIGS. 1 and 2, stationary rectangular frame 14 is formed of rectangular tubular shaped sidewalls 14*a* and 14*c* along its forward and rearward sides (as used herein, forward and rearward and front and back are used relative to the front of the housing 16 through which the boom 24 extends). Vertically extending sidewalls 14*b* and 14*d* complete the frame 14.

A rail support 40 is mounted to the inboard side of sidewall 14*a* and extends along substantially the entire length of the frame. A pair of parallel rails 42*a* and 42*b* are fixed adjacent the top and bottom edges of the rail support 40 for approximately its entire length. It will be noted that a like rail support having a pair of rails is similarly mounted on the rearward frame sidewall 14*c*, although not shown herein.

Movable frame 17, which carries the base 15, is also rectangular in form, having vertically extending sidewalls 17*a* through 17*d*. Forward sidewall 17*a* has mounted thereon at least two pairs of vertically spaced wheels 44*a*, 44*b* which are carried on shafts 45*a* and 45*b*, respectively. The wheels 44*a*, 44*b* are respectively received on the rails 42*a* and 42*b*. It will be noted that like pairs of wheels are correspondingly mounted on the rearward sidewall 17*c* of the movable frame and are received on that sidewall's rails, although not shown herein. The movable frame 17 is supported on these wheels to travel along the rails, e.g., 42*a* and 42*b*, to thereby move the carriage assembly in the X direction.

The drive for moving the inner frame 17 in the X direction is provided by a pair of driven worm gears 18*a, b* which are received in commercially available standard ballnut mechanisms 48. At least one ballnut mechanism 48 is mounted in frame sidewall 17*b* for each worm 18*a, b*; a second ballnut assembly for each worm can also be mounted in sidewall 17*d*.

The worms 18*a, b* are rotatably driven by a suitable drive motor 19, such as a Reliance TEFC-XP 75 HP, T56H frame 3500 RPM (DC) servomotor. Worm 18*a* is driven through gearing directly coupled to the drive motor 19, while worm 18*b* is driven via a drain drive (not shown) connected to the same gearing. Both worms 18*a, b* are driven in tandem and at the same speed of rotation. Rotation of the threaded worms advances the ball bearings of the ballnuts in the channels formed by the screw threads of the worms to thereby move the frame 17 along the rails. It is contemplated that the frame 17 would move in the X direction at speeds of around 30 f.p.m. in this embodiment.

Figure 3:
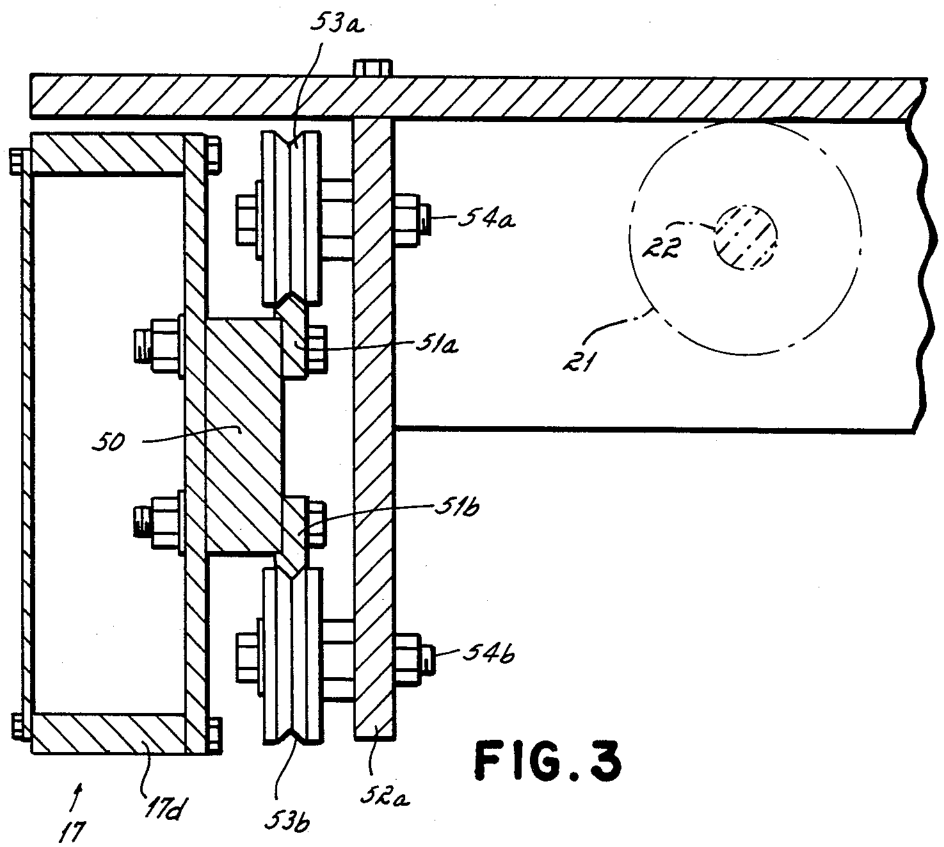
FIG. 3 is a cross sectional view taken through the inner frame of the housing along line 3—3 of FIG. 1.

With particular reference to FIGS. 2 and 3, base 15 is also mounted for movement on movable frame 17 in the Y axis direction, i.e., toward and away from the conveyor 12. More specifically, sidewall 17*d* of frame 17 has a rectangular tubular shape with a rail support 50 mounted to and extending along the inboard side of the sidewall 17*d*. A pair of parallel rails 51*a*, 51*b* are fixed adjacent the top and bottom edges of the rail support 50 along substantially its entire length. It will be noted that sidewall 17*b* is similar to side portion 17*d* in construction, and is provided with a like rail support and pair of rails along its outboard side.

Base 15 has a pair of spaced apart sides 52*a* and 52*b* which depend from the bottom of the base 15. Pairs of vertically spaced wheels 53*a* and 53*b* carried on shafts 54*a* and 54*b* are mounted to extend from the outward sides of both base sides 52*a* and 52*b*. The wheels 53*a*, 53*b* are respectively received on the rails 51*a*, 51*b* to thereby support the base 15 for movement thereon. It will be noted that the bottom of base 15 is slightly spaced above inner frame portions 17*b* and 17*d* to permit free movement of the base 15 in the Y axis direction.

Sides 52*a* and 52*b* are interconnected for additional lateral support and strengthening of base 15 through the use of forward, middle and rearward tie bars 55*a*, 55*b* and 55*c*, respectively, which are fixed to the sides 52*a*, 52*b* as well as the bottom of the base 15. Additional strengthening can likewise be provided between sidewalls 17*b* and 17*d* of the movable frame 17 through the use of tie bars (not shown) extending between the bottom edges of these sidewalls.

Base 15 is moved along the rails 51*a*, 51*b* in the Y direction by operation of a hydraulic cylinder 21. In this embodiment, cylinder body 21 is fixed to the bottom of the base 15, with the pushrod 22 of the hydraulic cylinder fixed at one end to the inboard side of movable frame sidewall 17*c*. Operation of the hydraulic cylinder causes the pushrod 22 to extend from or be withdrawn into the cylinder body 21, which in turn moves the base 15 along the rails 51*a*, 51*b* toward or away from the conveyor line 12.

Figure 4:
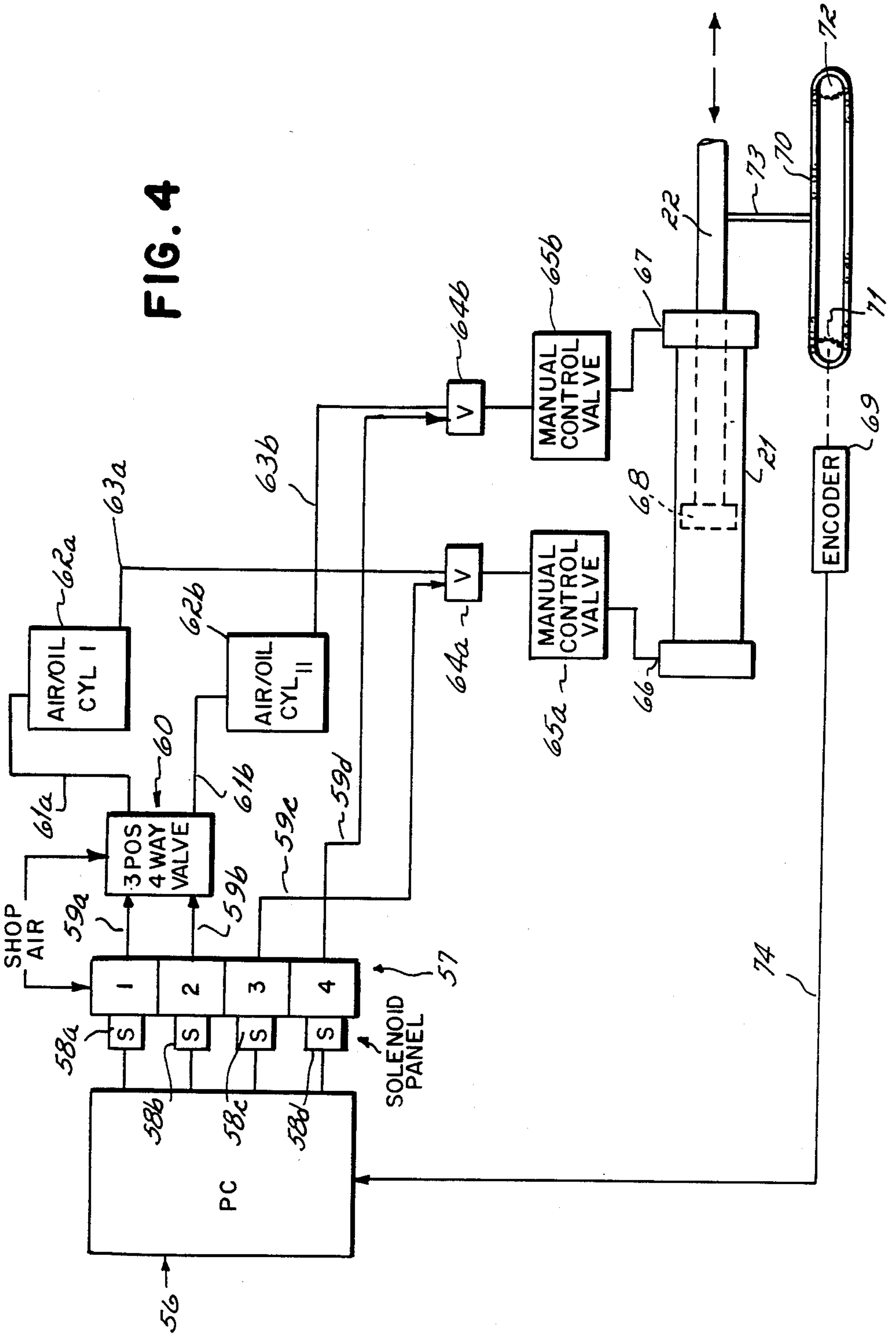
FIG. 4 is a schematic diagram of a control system for movement of the carriage assembly in the Y-axis direction (toward and away from a workpiece)

A combined pneumatic and hydraulic control system for controlling operation of the hydraulic cylinder mechanism is shown in FIG. 4. Use of this air-over-oil control system for the pneumatic cylinder prevents drift of the base 15 from a set position. The air-over-oil system also provides a smooth start and stop of the push rod 22, and thus of the carriage assembly, and serves to cushion Y axis movements. In comparison, a completely pneumatic system would typically require very large pneumatic cylinders and provide a much more jerky motion to the carriage assembly.

The air-over-oil system is shown in schematic form in FIG. 4. A programmable controller 56 provides four electrical inputs to a pneumatic manifold 57 which is connected to a source of high pressure air, such as shop air or a local compressor. Output from the manifold 57 is controlled by four solenoid valves 58*a*–58*d* which control air outputs to lines 59*a*–59*d*, respectively.

Lines 59*a*, 59*b* connect with a three-position four-way valve 60 at respective inlets. The four-way valve 60 is also provided with pressurized air from the same air source. Depending on which solenoid 58*a*, 58*b* is actuated, the four-way valve 60 is moved to either allow air through lines 61*a* or 61*b*. Line 61*a* connects with air-over-oil reservoir cylinder 62*a*, while line 61*b* connects with a like air-over-oil reservoir cylinder 62*b*. A line 63*a* carries oil from the reservoir 62*a* through an air controlled valve 64*a* and then a manual control valve 65*a* which regulates the flow of oil to fix a desired rate of flow per unit time through one port 66 of the hydraulic cylinder 21. Likewise, oil from air-over-oil reservoir 62*b* flows through a line 63*b* to an air controlled valve 64*b* and then a manual control valve 65*b* to another port 67 of hydraulic cylinder 21. The pneumatically controlled valves 64*a*, 64*b* and lines 63*a*, 63*b* are operated by air provided through lines 59*c*, 59*d*, respectively. Airflow to lines 59*c* and 59*d* is controlled by electrical inputs to solenoids 58*c* and 58*d*, respectively, from the programmable controller 56.

For purposes of example, assume the hydraulic cylinder 21 is operated to move the push rod 22 outwardly, that is, to move the carriage assembly toward a workpiece/conveyor line (illustrated in FIG. 1). A signal is provided to solenoid valve 58*a* opening it to allow air to go through line 59*a* to the three-position four-way valve 60, This moves the four-way valve 60 to allow air into line 61*a*. which pressurizes air-over-oil reservoir 62*a*. Pressurization of the air-over-oil reservoir 62*a* causes oil to flow out of the reservoir into line 63*a*.

In conjunction with the opening of solenoid valve 58*a*, solenoid valve 58*c* is also actuated causing air to flow through line 59*c* to open valve 64*a*. Oil thus flows through the valve 64*a* through the manual control valve 65*a*, which has been adjusted for the desired rate of flow per unit time, and then to the port 66 and into the interior of the cylinder 21. Oil entering through port 66 causes a piston 68 on the push rod 22 to move outwardly relative to the cylinder 21, thereby moving the carriage assembly which is connected to the cylinder 21 toward the workpiece/conveyor line.

At the same time that oil is flowing through port 66 into the cylinder 21, oil is also moving out of the cylinder through port 67 into line 63*b*. To this end, valve 64*b* is also opened through air pressure supplied to line 59*d* caused by opening of solenoid 58*d* via a signal provided by the programmable controller 56. Oil therefore flows through the valve 64*b* and into the air-over-oil cylinder 62*b*. It will be noted that an air pressure relief valve (not shown) is provided in the four way valve 60 for the lines 61*a*, 61*b* of the air-over-oil reservoirs 62*a*, 62*b* to allow air to be exhausted from these reservoirs when oil flows back into them.

Once the push rod 22 has been moved the desired distance, the programmable controller 56 sends a signal to close solenoid valves 58*c*, 58*d*, which in turn cause air piloted valves 64*a* and 64*b* to also close. Once valves 64*a* and 64*b* have closed, the oil in the system between these valves and the hydraulic cylinder 21 is trapped. This effectively fixes the position of the push rod 22, since the oil is a non-compressible fluid. The push rod 22 consequently does not drift once it has reached the desired position.

In order to operate the system so as to move the push rod 22 in the opposite direction, i.e., inwardly relative to the cylinder 21, solenoid valve 58*b* is actuated to allow air to flow into line 59*b* moving three-position four-way valve 60 to allow air to flow into line 61*b* to pressurize the air-over-oil reservoir 62*b*. The pneumatic control valves 64*a* and 64*b* are operated in a manner commensurate with the previous description to thereby permit oil to flow into the port 67 and out of the port 66 to thereby retract the piston 68 relative to the cylinder 21.

The position of the push rod 22 is ascertained through the use of an encoder 69 which engages a chain 70 carried on a pair of sprockets 71 and 72, the sprocket 71 being the drive for encoder 69. The push rod 22 is connected via a link element 73 to a point on the chain 70 so that the chain is driven around the sprockets 71, 72 by movement of the push rod 22. Movement of the chain 70 drives the encoder 69 which thereby yields a signal indicative of the amount of travel of the push rod 22. This signal is fed via electric line 74 to the programmable controller 56 where the signal is processed for an indication of push rod 22 movement, and hence movement of the entire carriage assembly in the Y axis direction.

Z Axis Movement

Figure 1B:
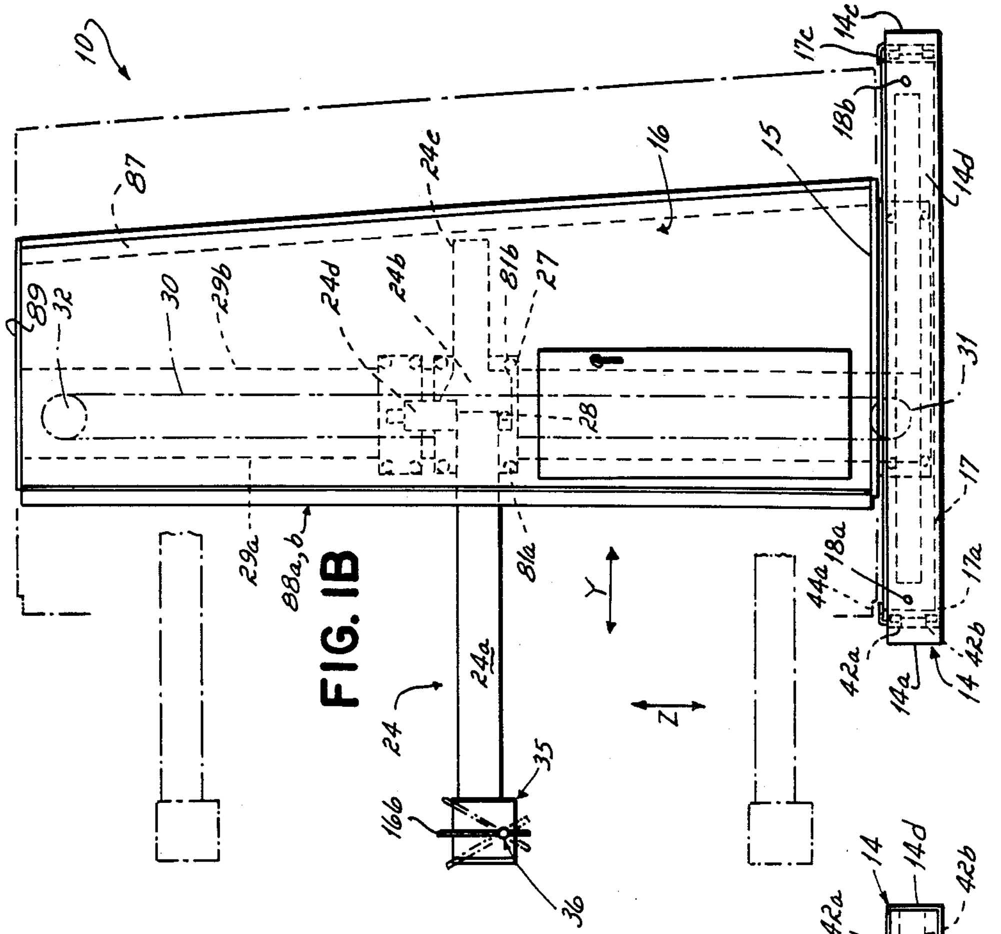
FIG. 1B is a side elevational view of the carriage assembly.
Figure 1A:
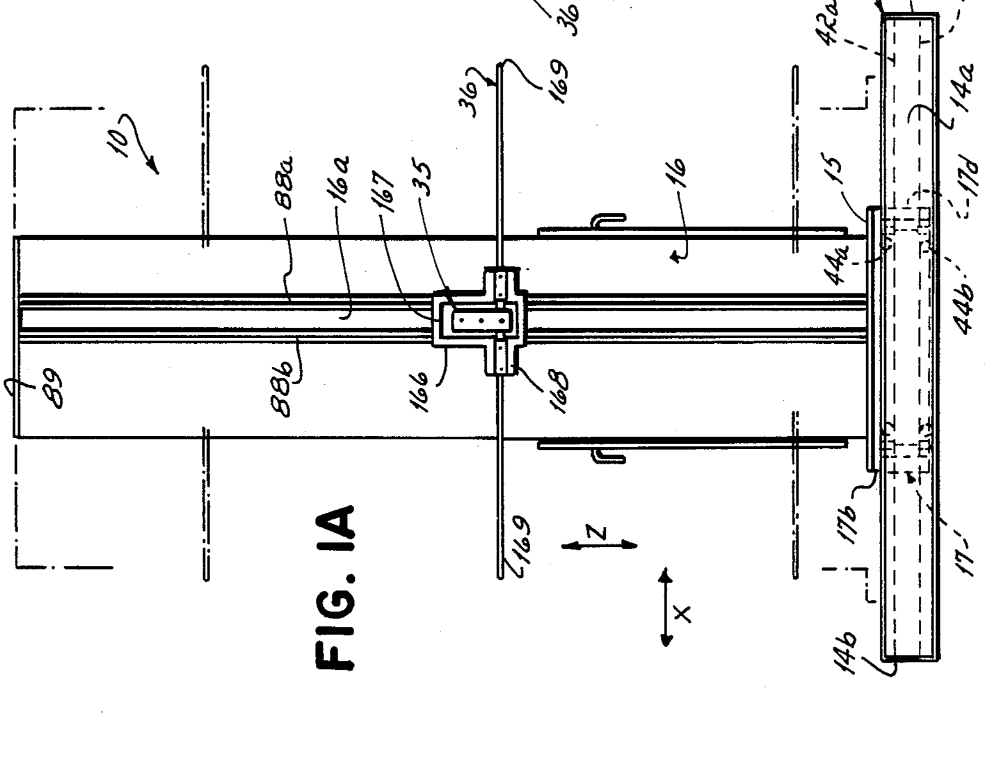
FIG. 1A is a front elevational view of the carriage assembly.
Figure 8:
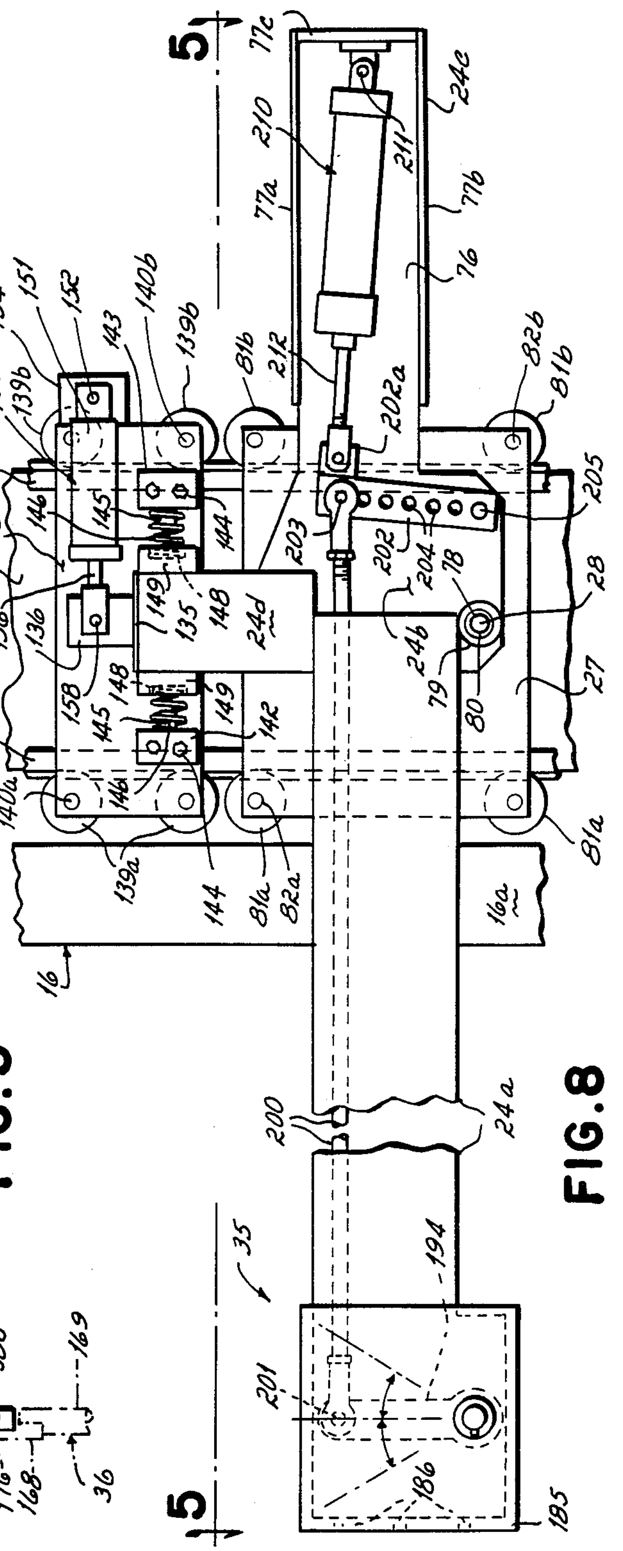
FIG. 8 is a side elevational view of the boom, carriage plate and shock absorber plate.
Figure 7:
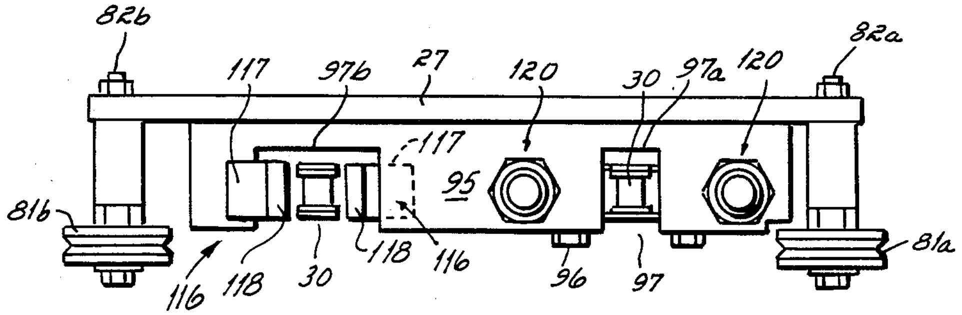
FIG. 7 is a cross-sectional view taken along line 7—7 of FIG. 6.

The construction of the boom 24 and movement of the boom in the Z axis or vertical direction will now be more particularly described. As shown in FIGS. 1B, 2 and 8, boom 24 is comprised of an elongated forwardly extending portion 24*a*, an intermediate plate portion 24*b*, and a rearward portion 24*c*. Elongated portion 24*a* has a rectangular tubular shape. A rectangular box 75 is formed at the end of the forward end of the boom, and serves as the mount for the spray gun mount 35 as well as housing a portion of the pivot mechanism for pivoting that mount, all of which will be described in further detail hereinafter. The rearward end of the elongated boom portion 24*a* is rigidly fixed, as by welding, to intermediate plate 24*b*.

Rearward boom portion 24*c* is comprised of a plate 76, which may be formed integral with intermediate plate 24*b* or rigidly fixed thereto, as by welding. Upper and lower plates 77*a* and 77*b*, respectively, extend from the outboard side of rear plate 76, and back wall 77*c* is fixed between the upper and lower plates 77*a*, 77*b* and the rear plate 76. A rearward housing is thus formed which serves as a mount for another portion of the spray mount pivot mechanism to be described in more detail hereafter.

Boom 24 is mounted to the carrier plate 27 at a pivot point comprised of a shaft 28 extending from the plate 27 which is received in a bore 78 provided in intermediate boom plate 24*b*. The bore 78 is surrounded by a tubular collar 79 which extends a small distance perpendicularly from the inboard side of plate 24*b*, to thereby effectively extend the bore for a more solid mount with pivot shaft 28. A bushing 80 is provided within the bore 78 for free movement of the boom about the pivot shaft 28. A retaining ring, such as a snap ring (not shown), is received in a groove provided around the end of the shaft 28 and beyond the tubular collar 79 to hold the carrier plate 27 against lateral movement on the shaft 28.

The carrier plate 27 is a rectangular metal plate which has two pairs of wheels 81*a*, 81*b* mounted on shafts 82*a*, 82*b* extending from its outboard side, with the wheels located adjacent the four corners of the plate 27. The wheels 81*a*, 81*b* are respectively received on the vertical rails 29*a* and 29*b*. The rails 29*a* and 29*b* are mounted to a vertically extending plate 84 which is suitably fixed near its lower end to the base plate 15, such as through rigid plate supports 86, and provided with lateral struts 85*a*, 85*b* which extend from the outboard side of the plate 84.

Within the housing 16 is a rigid framework which provides the structural support for the mechanism for vertically moving the boom. This includes the vertical plate 84, the base plate 15, a rearward strut 87, a pair of side-by-side L-shaped braces 88*a*, 88*b* and a top plate 89. The vertical plate 84 is welded to the top plate 89, with the rearward strut 87 and forward L braces 88*a*, 88*b* likewise welded to the top plate as well as to the base plate 15. The braces 88*a*, 88*b* are fixed in position to create the slot 16*a*. A very sturdy support is thus provided for the Z axis movement mechanism.

Figure 1C:
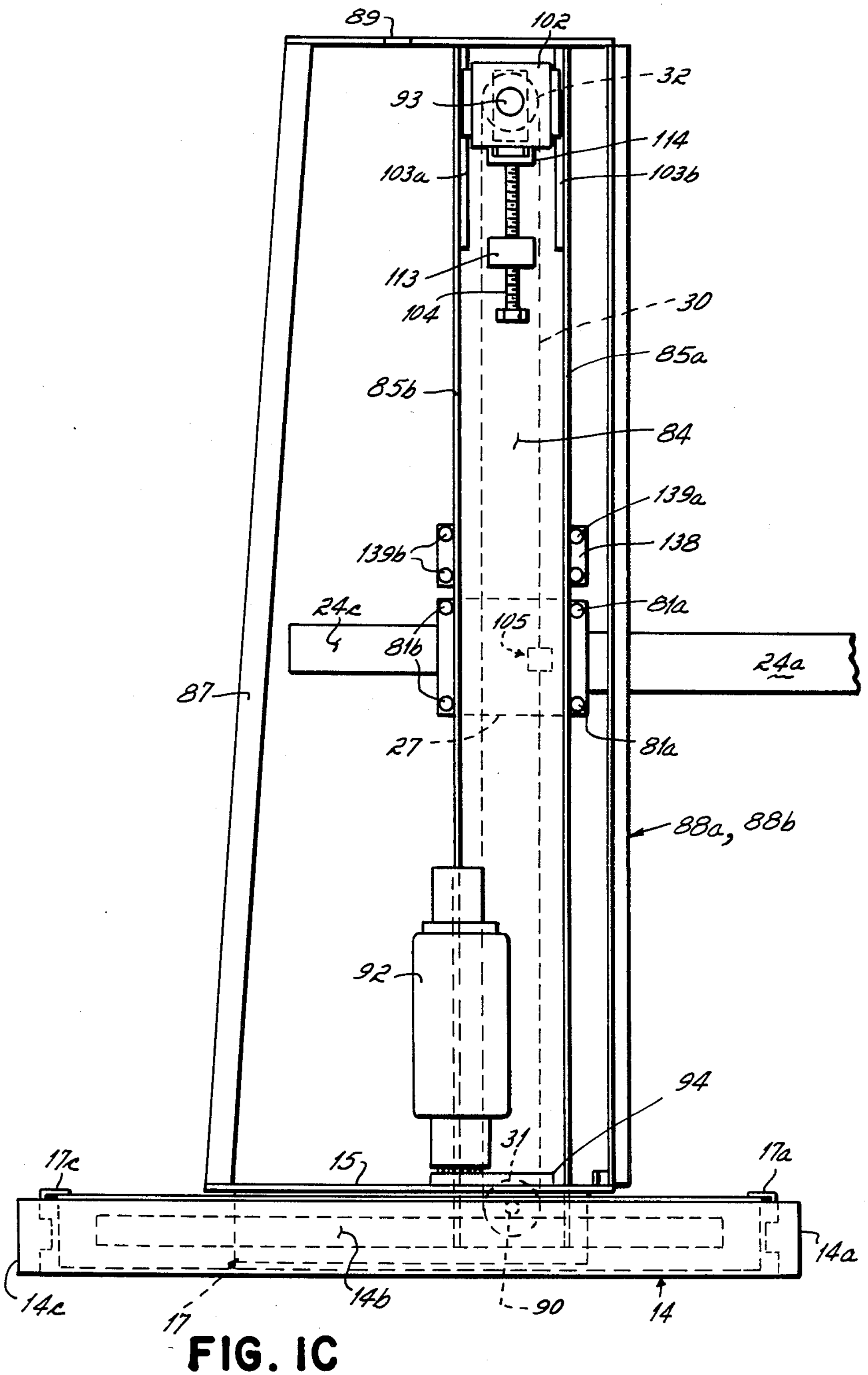
FIG. 1C is a side elevational view (opposite that of FIG. 1B) of the carriage assembly, with the housing removed for detail.

Carrier plate 27 is driven in the Z axis direction (vertically upwardly and downwardly) along rails 29*a*, 29*b* by a chain drive. The chain drive mechanism comprises chain 30, drive sprocket 31, and idler sprocket 32 (FIGS. 1B and 1C). The drive sprocket 31 is mounted on a drive shaft 90 which extends through vertical plate 84. The drive shaft 90 is journaled in a bearing flange assembly 91 mounted on vertical plate 84. A suitable drive motor 92 for rotating drive shaft 90, such as a G.E. Part No. 44A3996044/C14 Servo Motor with a torque rating of 240 in/lbs. is fixed outboard of plate 84. It will be noted that the drive motor 92 is coupled to the drive shaft 90 through a cone drive type gear reducer 94. The gear reducer 94 is a right angle drive type gear reducer and has a hollow driven shaft which couples to shaft 90 via a keyway. This is due to the fact that the drive shaft from the motor 92 extends vertically downwardly while the driven shaft 90 extends in a horizontal direction. Idler sprocket 32 is mounted on an idler shaft 93 near the upper end of vertical plate 84. Chain 30 thus forms two generally vertical runs extending between the sprockets 31 and 32.

A mechanism for adjusting the tension in the chain 30 is also provided. With reference to FIG. 1C, idler shaft 93 is journalled in a support block 102. The support block 102 is mounted between a pair of guides 103*a*, *b* and is slidable along the guides, which are fixed to the inside of struts 85*a*, 85*b*, respectively. A tensioner screw 104 is received in a threaded bore provided in a mounting block 113 which is also fixed to the vertical plate 84. The other end of the tensioner screw 104 is received in a suitable mount 114 provided in the bottom of the support block 102, such that the screw 104 bears against the bottom of the block. Rotation of the tensioner screw 104 moves the screw vertically in the mount block 113 to thereby move the idler shaft support block 102 and thereby adjust the tension in the chain 30.

Figure 6:
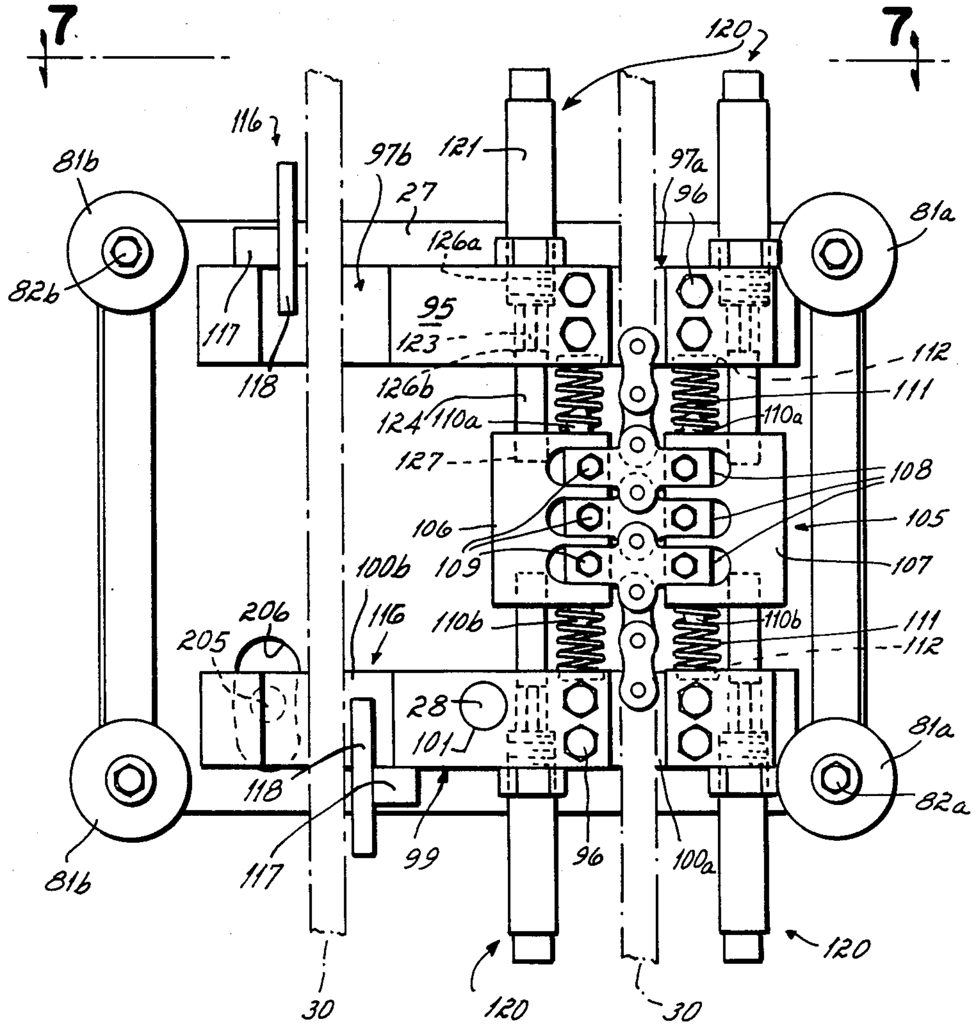
FIG. 6 is a side elevational view of the carriage plate connection to the chain drive.

Carrier plate 27 is fixed to a portion of chain 30 for travel along the vertical rails 29*a*, 29*b*. The connection of the plate to the chain is shown in FIG. 6 and includes a shock absorber mechanism designed to dampen the linear inertia developed in moving the boom 24 in the Z axis direction. For example, the boom may be moved vertically by the chain at speeds of up to 200 feet per minute. The total mass suspended on the chain may be up to 350 pounds. A substantial amount of momentum or linear inertia is thus developed in this mass when it is accelerated or decelerated. This linear inertia is effectively dampened in this invention through the provision of an inertial damping mechanism which interconnects the carrier plate 27 with the chain drive.

To this end, carrier plate 27 is provided with an upper solid block mount 95 which extends from the outboard side of the plate. The block 95 is fixed to the plate, as by bolts 96, and has a channel 97 formed through the block through which the chain 30 passes. A similar mounting block 99 is spaced from the top block 95 and is located toward the bottom of plate 27. Bottom mounting block 99 is likewise fixed to the outboard side of plate 27, as by bolts 96, and is provided with a similar channel 100 through which the chain 30 passes. It will be noted that bottom block 99 is laterally extended, and has a bore 101 formed therein within which a portion of pivot shaft 28 is fixed. Block 99 thus provides further support for the shaft 28 on which the boom 24 is mounted.

A carrier plate support 105 is provided on the chain 30. The support 105 comprises a pair of solid blocks 106 and 107 which are located on opposite sides of the chain 30. The blocks 106 and 107 are fixed to the chain 30 by a plurality of extended links 108, whose extensions are fixed to the respective support blocks 106 and 107. It will be noted that extended links 108 are provided on both the inboard and outboard sides of the chain 30 and are interconnected by bolts 109.

Each of the blocks 106, 107 has a pair of opposed locater pins 110*a*, 110*b* formed thereon. A locater pin 110*a* extends upwardly from each block, and a locater pin 110*b* extends downwardly from each block. Four resilient elements 111 in the form of compression springs have one end received on a respective locater pin 110*a*, 110*b*. The other end of each spring 111 is received in one of the walls 112 formed in the top and bottom plate blocks 95, 99. Carrier plate 27 is thus suspended on the chain 30 by the springs 111. This spring suspension more importantly permits limited movement of the carrier plate in the Z axis direction relative to the chain. Danly No. 9-1607-36 die springs are used herein for the compression springs 111. These are very stiff springs which require around 141 lbs. per 1/10 in. for compression with an approximate total compression of about 0.62 in.

A pair of chain guides 116 are provided for the rearward run of chain 30. These chain guides are each formed from a 1 in. by ½ in. piece of nylon 118 fixed to a suitable mount 117 which in turn is fixed to a respective block 95, 99.

Damping of the linear inertia built up through acceleration and deceleration of the mass suspended on the chain, e.g., the carrier plate and boom, is principally accomplished by use of opposed pneumatic shock absorbers generally indicated at 120. As illustrated herein, four shock absorbers, such as Endine OEM 10 shock absorbers, are provided in two opposed pairs. Each of the shock absorbers includes a cylinder body portion 121, a piston (not shown), a piston rod 123, and a shock pin 124. The cylinder portion 121 of each shock absorber 120 is fixed in a widened portion 126*a* of a respective stepped throughbore 126 extending through the top and bottom plate blocks 95, 99. The widened portion 126*a* of each of the stepped bores 126 may be provided with screw threads to affix the cylinder portion 121 therein. Piston rod 123 and a portion of shock pin 124 extend through the smaller diameter bore portion 126*b* of the throughbores 126, and are freely movable therein. Each shock pin 124 has its free end received in one of the blind bores 127 provided in the upper and lower surfaces of the support blocks 106, 107. The shock pins 124 may be press fit or welded in the blind bores 127.

The linear force developed through vertical acceleration and deceleration of the mass suspended on the chain is effectively dampened by the above described shock absorbing mechanism, thereby permitting very rapid Z axis movement of the boom with minimum stress and strain on the chain and carrier plate connection to the chain. For example, assume that the carrier plate had been accelerating upwardly as viewed in FIG. 6, and was abruptly brought to a halt by stopping the chain. The force generated through this sudden change in momentum of the carrier, boom and associated vertically moving parts is dampened and dissipated through compression of the upper shock absorbers and associated springs, and a corresponding extension of the lower shock absorbers and associated springs, by the carrier plate 27 as it moves vertically upwardly relative to the chain due to the inertia developed in the boom, carriage plate and related parts.

It will be noted that a stop 128 (FIG. 2) is located near the bottom of vertical plate 84 about midway between the rails 29*a* and 29*b*. The stop 128 is positioned to contact block 99 to prevent the carriage assembly from inadvertently traveling too far. A like stop (not shown) is provided on the upper portion of the vertical plate 84 to contact block 95 to the same end.

An additional shock absorbing means, such as a fluid type shock absorber can be associated with stop 128 to assist in absorbing a crash of the carriage assembly during loss of power, for example.

Besides the linear inertial force which is developed in Z axis movement, a moment of inertia is also developed in the elongated boom portion 24*a* through the same Z axis movement. In this regard, the elongated boom extension 24*a* effectively functions as a long lever arm extending from the pivot connection on the carrier plate 27. If the boom 24 were rigidly connected to the carrier plate, a substantial torque would be placed on this connection from the moment of inertia described. This would result in considerable stress on this connection, as well as on the wheels and rails over which the carrier plate 27 travels. Oscillation of the boom 24 would also likely occur from any abrupt stop. Any such oscillation would, of course, interfere with prompt and accurate aiming of the spray guns carried at the end of the boom.

These problems associated with the moment of inertia developed through very rapid movement of the boom 24 are solved in this invention through the provision of another shock absorbing mechanism adapted to dampen this inertial force generated in the boom. With particular reference to FIG. 8, this second shock absorbing mechanism functions to dampen the moment of inertia in the boom by first translating that moment of inertia into a rotational or angular force. That is, instead of a rigid connection between the boom 24 and the carrier plate 27, a pivotal connection is provided which permits the boom 24 to rotate about this pivot point on the pivot shaft 28. The moment of inertia developed in the elongated boom portion 24*a* is thus translated into a rotational force, which is then operated on by the second shock absorbing mechanism.

To this end, boom 24 is provided with a centering portion or arm 24*d* in the form of a short rectangular tube. Centering arm 24*d* is fixed, as by welding, to the top rear of elongated boom portion 24*a* as well as to the intermediate boom plate portion 24*b*. In this embodiment, boom centering arm 24*d* is located directly above the pivot shaft 20*a*, and roughly at a right angle to the longitudinal axis of the boom 24. The top end of boom centering arm 24*d* is closed by a plate 135 which serves as a base for a vertically extending anchor plate 136.

Associated with boom centering arm 24*d* is a shock absorber plate 138. Shock absorber plate 138 is a rectangular metal plate provided with the pairs of wheels 139*a*, 139*b* carried on shafts 140*a*, 140*b* with the wheels located adjacent the corners of the plate and on the outboard side thereof. Wheels 139*a*, 139*b* are respectively received on the vertical rails 29*a* and 29*b* for travel of the plate 138 along the rails.

Mounting blocks 142 and 143 are affixed to the inboard side of the shock absorber plate 138, as by bolts 144, and extend generally perpendicularly therefrom. The mounting blocks 142 and 143 are located on opposite lateral sides of the boom centering arm 24*d*. Each mounting block 142, 143 has a pair of side by side locater pins 145 extending from the block toward the boom centering arm 24*d*. One end of a resilient element 146, such as a Double Die Danly spring No. 9-2412-36, is received on each locater pin. Only one pin 145 and spring 146 combination is shown extending from each block in FIG. 8; the other combination for each block is hidden in the illustration. These springs have a compression rate of about 204 lbs. per 1/10 in. The other end of each spring is received in a respective well 148 provided in a pair of lateral arm extensions 149 formed on the centering arm **24*d*. It will thus be seen that the boom centering arm 24*d* is generally centered on the shock absorber plate 138 in this manner. Shock absorber plate 138 is also principally carried by this spring connection with the boom centering arm 24*d* for movement in tandem with carrier plate 27**.

Damping of the rotational force developed in the elongated boom portion **24*a* upon acceleration or deceleration of the boom 24 is provided by a pneumatic shock absorber 150, such as an Endine Double Acting shock absorber No. DA-60x1. Shock absorber 150 has a cylinder body portion 151 which is pivotally connected at one end to the shock absorber plate 138, as by the pivot connection 152 on a flange portion 154 extending rearwardly from the shock absorber plate. The piston rod 156 of pneumatic cylinder 150 has its free end pivotally connected at a pivot 158 on the anchor plate 136 of centering arm 24*d***.

To illustrate the operation of the second shock absorber mechanism to dampen the moment of inertia developed in the boom, if the boom 24 illustrated in FIG. 8 had been accelerating upwardly and then was brought to an abrupt halt by stopping the chain 30, elongated boom portion **24*a* would tend to continue to move upwardly due to its inertia, causing the entire boom 24 to rotate clockwise on pivot shaft 28, thereby rotating the boom centering arm rearwardly from the vertical. This relatively small rotational movement of the boom, on the order of only a few degrees of arc, is dampened and dissipated by the action of shock absorber 150 opposing the compressive force placed on the shock absorber by centering arm 24*d***. The boom consequently returns to its horizontal position without any significant oscillation.

Flight Bar and Pivoting Mount

Figure 9A:
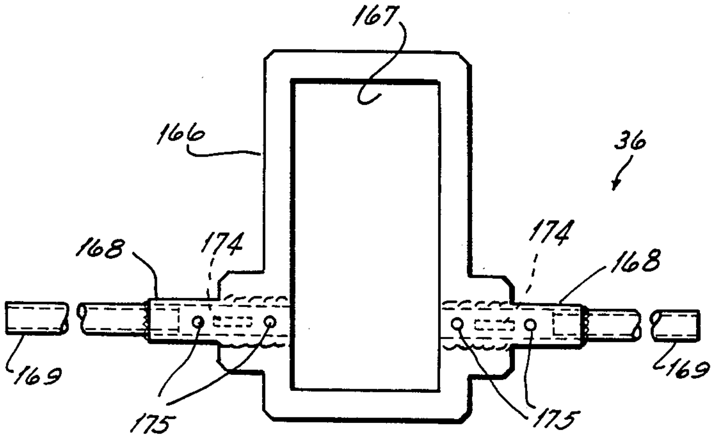
FIG. 9A is a front elevational view of a first embodiment of a flight bar.
Figure 9B:
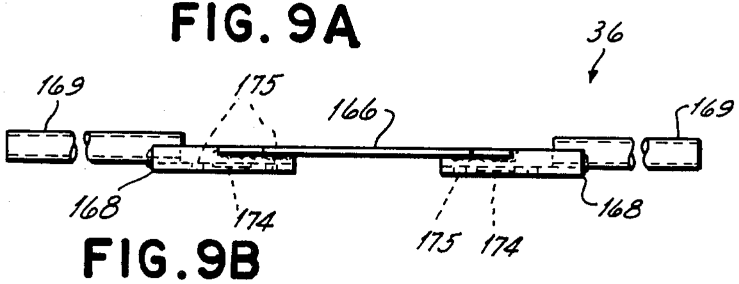
FIG. 9B is a top plan view of the flight bar of FIG. 9A.

An additional feature of this invention is the provision of a quick change spray gun flight bar which permits rapid interchange between various sets of spray guns. With reference now to FIGS. 9A and 9B, a horizontal type quick change flight bar 36 is comprised of a rectangular-shaped mounting frame or yoke 166 which surrounds an open center portion 167. A pair of stubs 168 which are semi-annular in cross-section extend outwardly from opposite side of the mounting plate 166 a short distance. A length of rigid tubing 169 is fixed, as by welding, to and extends outwardly from each of the stubs 168. Spray guns 37 are mounted along the lengths of tubing 169 in the number desired (FIG. 1).

Figure 5:
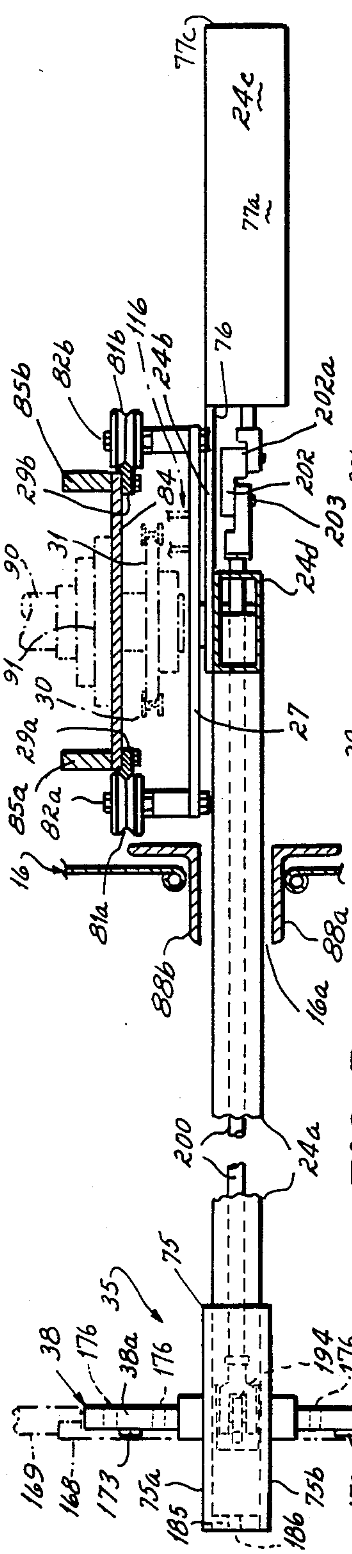
FIG. 5 is a cross-sectional view taken along line 5—5 of FIG. 8.
Figure 10:
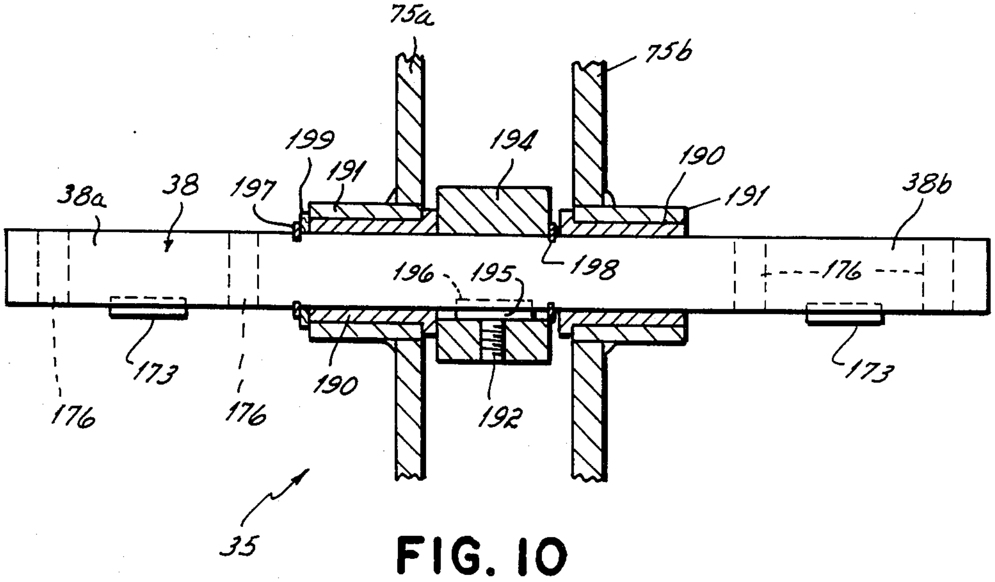
FIG. 10 is a top plan view of the flight bar mount, partly in section for detail.

The flight bar 36 is received on the spray gun mount 35 located at the end of the boom 24 (FIG. 5) by attachment to the flight bar mounting shaft 38 which extends through the spray gun mount housing 75. Shaft 38 presents two short shaft portions **38*a* and 38*b* on either side of the mount housing 75. Each of the shaft portions 38*a*, 38*b* has a key 173 which is received in a keyway 174 formed in each of the stubs 168 of the flight bar 36. The flight bar is secured to the shaft 138 by the use of screws or bolts (not shown) which extend through holes 175 provided in the stubs 168 and are received in corresponding holes or ways 176 provided in the shaft portions 38*a*, 38*b* (FIG. 10). The flight bar is additionally supported by edge contact between the interior side of the mounting plate 166 and the outside of the mount housing 75**.

It is contemplated that a particular type of spray gun would be carried on one flight bar, while another type of spray gun, e.g. having a different nozzle size, would be carried on another flight bar. The changeover between different spray guns would thus be quickly and efficiently accomplished by simply removing the entire flight bar 36 of one type of spray guns from the spray gun mount 35 and then replacing it with another flight bar carrying the desired spray guns.

Figure 9C:
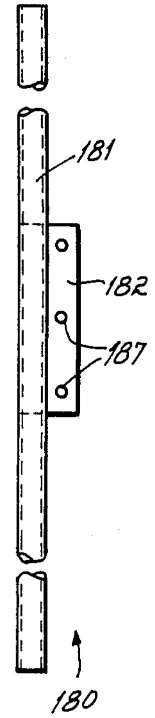
FIG. 9C is a front elevational view of a second embodiment of a flight bar.

FIG. 9C shows another embodiment of the quick change flight bar, which extends vertically rather than horizontally. This flight bar 180 is comprised of a single length of rigid tubing 181 which is fixed, as by welding, to a mounting bracket 182 which is located at approximately the midpoint of the tubing and extends laterally therefrom. Instead of being carried on the flight bar mounting shaft 38, vertical flight bar 180 is fixed to a plate 185 (FIG. 8) forming the front of flight bar mount housing 75. To this end, a plurality of holes 186 are provided in the mounting bracket 182 through which bolts or screws (not shown) extend and are received in corresponding ways or holes 187 in the plate 185.

Another feature of this invention is the provision of a pivot mechanism for aiming the spray guns 37 on the horizontal flight bar 36 upwardly or downwardly. With specific reference to FIG. 10, flight bar mounting shaft 38 is rotatably mounted in a pair of bearings 190 located in collared throughways 191 in sidewalls **75*a* and 75*b* of mount housing 75. A lever arm 194 (best seen in FIG. 8 and 10) extends upwardly from shaft 38 and is fixed about the shaft 38 in a suitable manner, as by a key 195 which is received in a keyway 196 provided in shaft 172. A set screw (not shown) received in a threaded throughbore 192 can be additionally provided to fix key 195 in place. Retaining rings 197 and 198 are additionally provided to maintain the shaft 38 in position against lateral movement. Washers, such as washer 199**, can be used with the retaining rings, as needed.

Lever arm 194 is moved through the action of a pushrod 200 (FIG. 8). One end of the pushrod 200 is pivotally connected to the free end of lever arm 194, as at pivot connection 201. The pushrod 200 extends from the lever arm 194 through the interior of the tubular elongated boom portion **24*a*, and is connected at its other end to a pivot arm 202, as at pivot connection 203. Pivot arm 202 is carried on a pivot shaft 205 which extends through a bore (not shown) in intermediate boom plate 24*b* as well as through a hole 206 (FIG. 2) provided in carrier plate 27. It will be noted that the hole 206 is elongated in the vertical direction with a slight arc to accommodate angular movements of the boom 24 relative to the carrier plate 27**.

A plurality of holes 204 are provided along the length of the pivot arm 202 and serve as different pivot connections for the end of the pushrod 200, providing various maximum angular movements of the lever arm 194 from the vertical, depending on which hole 204 is used. For instance, the uppermost pivot connection hole 204 may represent a maximum travel of 30° for the lever arm 194, with the pivot connection hole below that representing a 25° angulation, and so on down the line in 5° increment down to a minimum angle of 5°.

Pivot arm 202 is moved through the use of a pneumatic pump cylinder 210, such as a Clevis air cylinder. One end of the pump cylinder 210 is pivotably connected, as at 211, to the rear wall 77*c* of rearward boom portion 24*c*. Piston rod 212 of the pump has its free end pivotably connected to a rearwardly extending flange portion 202*a* of pivot arm 202. Operation of pump cylinder 210 to drive the piston rod 212 forwardly or rearwardly thus moves pivot arm 202 about its pivot shaft 205, in turn moving the pushrod 200 forwardly or rearwardly to move the lever arm 194 and thereby rotate the shaft 172 to aim the spray guns 37 upwardly or downwardly.

In operation of the spray gun carriage assembly of this invention, the boom is moved into spraying position relative to the workpiece by movement of the base 15 on the inner frame 17 in the horizontal plane, i.e., in the X and Y axes. Movement in both these axes can, of course, continue during the spray program. The boom 24 is in turn vertically reciprocated, i.e., in the Z axis, during the spray program to move the mounted spray guns from top to bottom of the workpiece. Because of the variable stroke of the reciprocating mechanism, vertical movement of the spray gun can be specifically adapted to follow any change in vertical dimension of the workpiece. This yields a very efficient spray pattern for the spray guns, reduces waste in terms of overspray, and enables a faster throughput of workpieces. The novel inertial damping mechanisms associated with the reciprocating mechanism enables such rapid vertical movement with a minimum of oscillation of the boom and stress on the equipment, and ensures accurate aiming of the spray gun throughout the spray program. Provision of a pivoting mechanism for the spray gun mount further enhances the ability to accurately aim the spray guns, and the use of a quick change flight bar for mounting the spray guns to the spray gun mount reduces the down time required in any spray gun change.

Thus, while the invention has been described in connection with a certain presently preferred embodiment, those skilled in the art will recognize many modifications of structure, arrangement, portions, elements, materials, and components which can be used in the practice of the invention without departing from the principles of this invention.

What is claimed is:

1. A spray gun carriage assembly comprising:
a base;
a spray gun mount adapted to support at least one spray gun operable to spray a coating upon a workpiece;
reciprocating means connected to said base for reciprocating said spray gun mount along a vertical axis, said reciprocating means accelerating and decelerating said spray gun mount to produce a rotational and a linear inertial force while moving along said vertical axis;
damping means carried by said reciprocating means for damping said rotational and linear inertial forces.

2. The spray gun carriage assembly of claim 1 wherein said reciprocating means further comprises:
an elongated boom having two ends, said spray gun mount being carried by one end of said boom,
a movable boom mount for carrying said boom along said vertical axis, said boom being pivotally connected to said boom mount for rotation of said boom with respect to said boom mount in a vertical plane,
boom mount moving means for reciprocating said boom mount an adjustable distance along said vertical axis.

3. The spray gun carriage assembly of claim 2 wherein said damping means includes a rotational shock absorbing means for damping a rotational inertial force produced by said boom when said boom is accelerated and decelerated.

4. The spray gun carriage assembly of claim 2 wherein said damping means includes a linear shock absorbing means for damping a linear inertial force exerted by said boom and boom mount when said boom is accelerated or decelerated.

5. The spray gun carriage assembly of claim 3 wherein said rotational shock absorbing means comprises:
at least one compression member disposed in said vertical plane and connecting said boom mount to said boom such that said rotational movement of said boom relative to said boom mount is limited by said compression member, and
a first shock absorber connected between said boom and said boom mount, said first shock absorber acting against said rotational movement of said boom and damping said rotational inertial force exerted by said boom when said boom is accelerated or decelerated.

6. The spray gun carriage assembly of claim 5 wherein said boom comprises an elongated boom portion and a boom centering portion extending in said vertical plane from said elongated boom portion,
said boom mount comprising a first plate to which said boom is pivotally connected, and a second plate spaced from said first plate, said first and second plates being moved in tandem by said boom mount moving means.

7. The spray gun carriage assembly of claim 6 wherein said boom centering portion extends generally perpendicularly from said elongated boom portion, said boom centering portion being movable along a radius having its center at said boom pivot connection.

8. The spray gun carriage assembly of claim 4 wherein said boom mount moving means comprises:
a driven member which travels along a vertical path parallel to said vertical axis, and
means for driving said driven member an adjustable distance along said vertical path;
said linear shock absorbing means comprising suspension means for suspending said boom mount on said driven member for limited movement of said boom mount relative to said driven member along said vertical axis, and a second shock absorber connected between said suspension means and said boom mount, said second shock absorber acting against said linear movement of said boom relative to said boom mount and damping a linear inertial force exerted by said boom and boom mount when said boom is accelerated or decelerated.

9. The spray gun carriage assembly of claim 8 wherein said suspension means for said boom mount comprises:
a mounting element fixed to said driven member, said mounting element having a top and a bottom, and
at least one compression member interconnecting said boom mount and one of the top and bottom of said mounting element such that said boom mount is suspended on said mounting element by said compression member, said second shock absorber being connected between said boom mount and said mounting element.

10. The spray gun carriage assembly of claim 9 wherein said suspension means for said boom mount comprises:

a mounting element fixed to said driven member, said mounting element having a top, bottom and opposed sides with said driven member disposed therebetween;

two pairs of compression members, each of said compression members having two ends, each of said compression member of said one pair having an end mounted to the top of said mounting element along one side thereof, each of said compression members of said other pair having an end mounted to the bottom of said mounting element along the other side thereof, the other ends of said compression members being mounted to said boom mount, and at least one pair of opposed second shock absorbers, one of said second shock absorbers being connected to the top of said mounting element and the other of said second shock absorber being connected to the bottom of said mounting element.

11. The spray gun carriage assembly of claim 6 wherein said rotational shock absorbing means comprises:

a pair of compression members, each of said compression members being mounted between said second plate and said boom centering portion; and a shock absorber connected between said second plate and said boom centering portion.

12. A spray gun carriage assembly comprising:

a base, a spray gun mount adapted to mount at least one spray gun operable to spray a coating upon a workpiece, an elongated boom having two ends, said spray gun mount being carried by one end of said boom, a movable boom mount for carrying said boom along a first geometric axis, said boom being pivotally connected to said boom mount for limited rotation of said boom with respect to said boom mount in a plane parallel to said first geometric axis, reciprocation means for moving said boom mount an adjustable distance along said first geometric axis, rotational shock absorbing means for damping a rotational inertial force exerted by said boom when said boom is accelerated or decelerated in reciprocation, and linear shock absorbing means for damping a linear inertial force exerted by said boom and boom mount when said boom is accelerated or decelerated in reciprocation.

13. The spray gun carriage assembly of claim 12 wherein said boom mount moving means includes a driven member which travels along a path parallel to said first geometric axis, said linear shock absorbing means comprising:

suspension means for suspending said boom mount on said driven member for limited movement of said boom mount relative to said driven member along said first geometric axis, and a second shock absorber connected between said suspension means and said boom mount, said second shock absorber acting against said limited movement of said boom mount relative to said driven member and damping said linear inertial force exerted by said boom and boom mount when said boom is accelerated or decelerated.

14. The spray gun carriage assembly of claim 12 wherein said rotational shock absorbing means comprises:

at least one resilient member having two ends, one end of said resilient member being mounted to said boom mount and the other end of said resilient member being mounted to a side of said boom and extending in said plane parallel to said first geometric axis such that rotary movement of said boom is limited by said resilient member, a first shock absorber connected between said boom and said boom mount, said first shock absorber acting against said limited rotation of said boom and damping said rotational inertial force developed in said boom when said boom is accelerated or decelerated.

15. The spray gun carriage assembly of claim 12 further including means for moving said base along a second geometric axis which is orthogonal to said first axis, and means for moving said base along a third geometric axis which is orthogonal to both said first and second axes.

16. A spray gun carriage assembly having three axes of movement, comprising:

a base, means for moving said base along a first axis in a horizontal plane, means for moving said base along a second axis in a horizontal plane, a spray gun mount adapted to support at least one spray gun thereon, an elongated boom, said spray gun mount being carried on said boom, elevator means carried by said boom for moving said boom along a third axis in a vertical plane perpendicular to said horizontal plane said boom producing a rotational inertial force and a linear inertial force upon movement with said elevator means along said third axis, a boom mounting member for mounting said boom to said elevator means, said boom being pivotally connected to said boom mounting member for limited pivotal movement of said boom relative to said boom mounting member in said vertical plane, and rotational shock absorbing means engaging said elongated boom for damping rotational inertial force exerted by said boom.

17. The spray gun carriage assembly of claim 16 wherein said elevator means comprises a driven member which is driven along said third axis, and drive means for driving said driven member, and wherein said boom mounting means includes linear shock absorbing means for damping said linear inertial force exerted by said boom, said linear shock absorbing means interconnecting said driven member and said boom mounting member.

18. The spray gun carriage assembly of claim 17 wherein said boom has an elongated portion extending generally horizontally, and a boom centering portion having opposed sides and extending generally vertically and perpendicular to the elonaged portion, said elevator means further including a vertically extending rail, said boom mounting member comprising:

a first plate mounted for movement along said rail, said boom being pivotally connected by a shaft to said first plate, a second plate mounted for movement along said rail, said first plate carrying said linear shock absorbing means and said second plate carrying said rotational shock absorbing means.

19. The spray gun carriage assembly of claim 18 wherein said rotational shock absorbing means comprises:

a pair of compression elements, each of said compression elements being located on one of said sides of said boom centering portion and interconnecting said second plate and said boom centering portion, said boom centering portion thereby being centered relative to said second plate by said pair of compression elements, and a shock absorber connected between said boom centering portion and said second plate such that said shock absorber dampens said rotational inertial force exerted by said boom.

20. The spray gun carriage assembly of claim 19 wherein said linear shock absorbing means comprises:

a mounting element having a top, bottom and opposed sides, said driven member being connected to said mounting element between said opposed sides thereof, two pairs of compression elements, each compression element having two ends, each of said compression elements of said one pair having an end mounted to the top of said mounting element, along one side thereof, each of said compression elements of said other pair having an end mounted to the bottom of said mounting element along the other side thereof, the other ends of said pairs of compression elements being mounted to said first plate, said first plate being suspended on said driven member by said compression elements, and two pairs of opposed shock absorbers, one of said pairs of shock absorbers extending between the top of said mounting element and said first plate, and the other of said pairs of shock absorbers extending between the bottom of said mounting element and said first plate, said opposed shock abosrbers damping said linear inertial force exerted by said boom.

21. The spray gun carriage assembly of claim 16 wherein said spray gun mount is rotatably mounted on said boom, said spray gun mount further comprising an adjustable pivot mechanism for pivoting said spray gun mount, said pivot mechanism comprising:

a movable lever arm having opposed ends, one end of said lever arm being fixed to said spray gun mount so that movement of said lever arm causes said spray gun mount to rotate;

a push rod pivotally connected to the other end of said lever arm, and pusher means movable with said boom and connected to said push rod for axially moving said push rod, said push rod moving said lever arm to effect rotation of said spray gun mount.

22. The spray gun carriage assembly of claim 21 wherein said spray gun mount is an elongated shaft extending perpendicularly from said boom and being mounted adjacent the end of said boom, and wherein said pusher means for moving said push rod comprises a pivot arm having a pivot point, a plurality of push rod connection points being formed along the length of said pivot arm, said push rod being connected to a selected one of said push rod connection points, each of said push rod connection points permitting a different amount of said axial movement of said push rod, and a pneumatically driven cylinder connected between said pivot arm and said boom for driving said pivot arm about its pivot point to thereby move said push rod.

23. The spray gun carriage assembly of claim 22 further comprising a flight bar adapted to carry a plurality of spray guns thereon, said flight bar comprising a flight bar mounting plate releasably secured to said elongated shaft, and a flight shaft extending from said mounting plate on which said spray guns are fixed.

24. The spray gun carriage assembly of claim 16 wherein said means for moving said base along a first axis in a horizontal plane comprises:

a hydraulic cylinder having a piston movable within a cylinder chamber and a piston rod connected to said piston, said cylinder chamber having a first port and a second port through which a hydraulic fluid can flow into and out of said cylinder chamber, said hydraulic cylinder being connected between said base and an anchor surface which is stationary relative to said base, such that operation of said hydraulic cylinder causes said base to move toward or away from said anchor surface and along said first axis, first and second pressurizable air-over-oil reservoirs each having an airline and an oil line, said oil line of said first reservoir connected with said first port of said hydraulic cylinder, said oil line of said second reservoir connected with said second port of said hydraulic cylinder, a first valve located in said oil line of said first reservoir, and a second valve located in said oil line of said second reservoir, means for selectively pressurizing said first and second reservoirs with air supplied through said air lines of said first and second reservoirs, said first reservoir when pressurized with said first and second valves open causing oil to flow into said first port of said hydraulic cylinder and out of said second port to drive said piston in one direction in said cylinder, said second reservoir when pressurized with said first and second valves open causing oil to flow into said second port and out of said first port to drive said piston in an opposite direction in said cylinder, movement of the piston causing said piston rod to move said base toward or away from said anchor surface, said first and second valves when closed preventing further movement of said piston, piston rod and base.

* * * * *